United States Patent
Zieger (10) Patent No.: US 8,973,739 B2
(45) Date of Patent: Mar. 10, 2015

(54) BELT CLEANER SYSTEM AND METHOD

(75) Inventor: Andrew J. Zieger, Grand Rapids, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 13/336,899

(22) Filed: Dec. 23, 2011

(65) Prior Publication Data

US 2012/0160634 A1 Jun. 28, 2012

Related U.S. Application Data

(60) Provisional application No. 61/427,013, filed on Dec. 23, 2010.

(51) Int. Cl.
*B65G 45/12* (2006.01)

(52) U.S. Cl.
CPC ..................................... *B65G 45/12* (2013.01)
USPC ........................... 198/497; 198/494; 198/499

(58) Field of Classification Search
USPC ......... 198/497, 499, 493, 494, 495, 496, 498, 198/500, 501
See application file for complete search history.

(56) References Cited

U.S. PATENT DOCUMENTS

| | | | |
|---|---|---|---|
| 3,631,968 A | 1/1972 | Ward | |
| 3,929,345 A | 12/1975 | Nasby et al. | |
| 4,533,037 A | 8/1985 | Kerr | |
| 4,825,996 A | 5/1989 | Davidts | |
| 4,863,148 A | 9/1989 | Hufnagel | |
| 4,953,689 A * | 9/1990 | Peterson et al. | 198/497 |
| 5,114,000 A | 5/1992 | Rappen | |
| 5,301,797 A | 4/1994 | Hollyfield, Jr. et al. | |
| 5,611,524 A | 3/1997 | Gordon | |
| 5,732,436 A | 3/1998 | Feigenbaum | |
| 5,809,605 A | 9/1998 | Gringer | |
| 5,865,294 A | 2/1999 | Betz | |
| 5,992,614 A | 11/1999 | Mott | |
| 6,038,729 A | 3/2000 | Feigenbaum | |
| 2005/0121294 A1 * | 6/2005 | Finger et al. | 198/499 |

FOREIGN PATENT DOCUMENTS

| | | |
|---|---|---|
| EP | 0 573 688 A1 | 12/1993 |
| GB | 2 221 440 A | 2/1990 |
| JP | S60-262706 A | 12/1985 |

* cited by examiner

*Primary Examiner* — Gene Crawford
*Assistant Examiner* — Lester Rushin
(74) *Attorney, Agent, or Firm* — Fitch, Even, Tabin & Flannery LLP (57) ABSTRACT

A snap-fit scraper blade is provided for being snap-fit onto a mounting pole. The scraper blade has a blade body including an upper scraping portion and a lower mounting portion. The lower mounting portion has depending legs with inner surfaces that are configured for snap-fitting the scraper blade body onto a square mounting pole.

2 Claims, 9 Drawing Sheets

BELT CLEANER SYSTEM AND METHOD

CROSS REFERENCES TO RELATED APPLICATIONS

This patent claims benefit under 35 U.S.C. §119 (e) to U.S. Provisional Application No. 61/427,013 entitled "Belt Cleaner System and Method" filed Dec. 23, 2010, the contents of which are incorporated herein by reference in its entirety.

BACKGROUND OF THE INVENTION

There are known belt cleaners that employ a scraper blade which is molded directly onto the pole, which eliminates gaps between the blade and the pole. However this method has many disadvantages. The blade is not replaceable, so once it wears out the entire blade and pole must be replaced. Also, these belt cleaners are not easily tailored to the width of the conveyor and the belt, because the blade is molded to a specific width and cannot be cut shorter without damaging the pole.

Prior belt cleaner systems have used round poles, which by nature do not have any horizontal surfaces for debris to collect.

Prior belt cleaner systems for snap-fit conveyor belt cleaner blades have used a round pole which has a key bar projecting upwardly therefrom and a corresponding key-way in the blade body to prevent rotation of the blade relative to the pole. The key bar is a separate piece which requires a mating groove to be machined into the pole. The key bar is then permanently glued or welded in place and creates another interface which can harbor bacteria and is difficult to clean.

Other conveyor belt cleaners in the market use pins to attach the blade to the pole.

Competitive products have used secondary collars or stop features to prevent migration of the blade relative to the pole, which can be difficult to clean or could potentially contain hardware which could become loose and end up in the product.

DETAILED DESCRIPTION OF PREFERRED EMBODIMENTS

Figure 1:
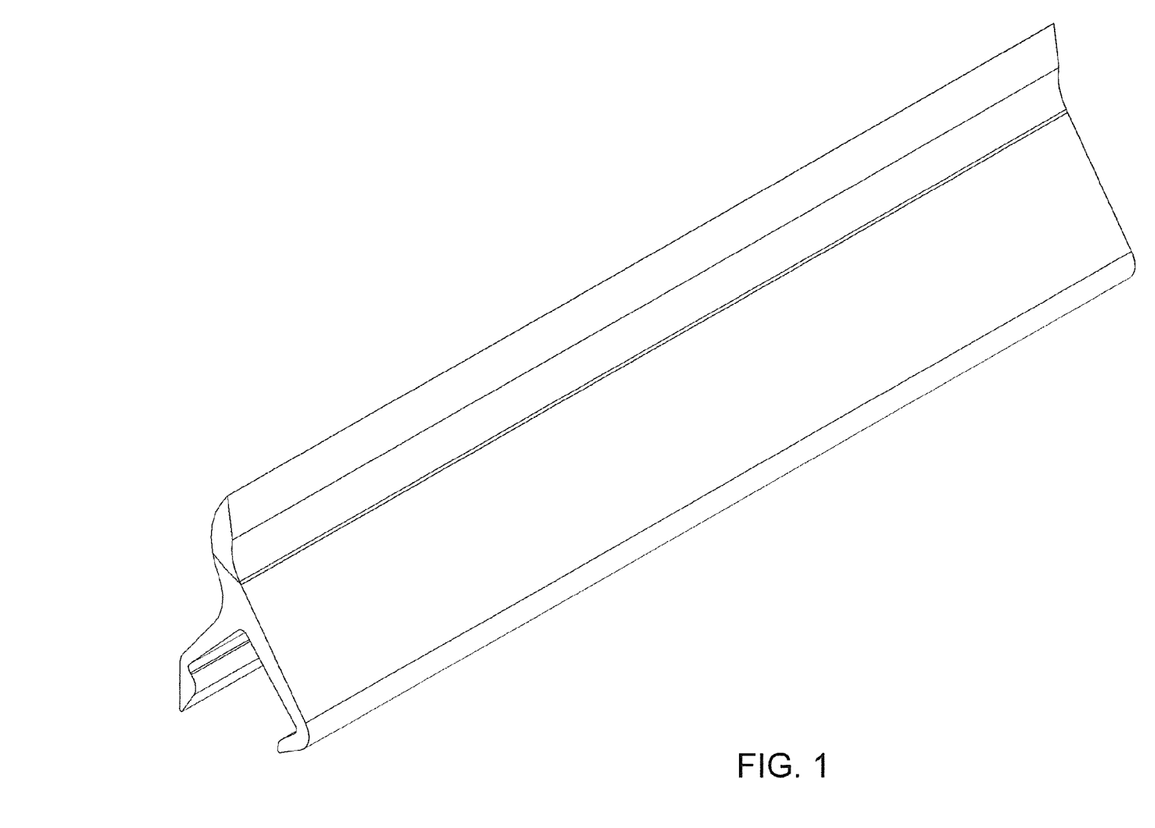
FIG. 1 is a perspective view and FIG. 1A is an end elevational view of a snap-fit scraper blade in accordance with the present invention.

This invention pertains to a scraper blade (FIG. 1) for a light duty conveyor belt cleaner (FIGS. 2-5) which attaches to the pole of the cleaner in a snap-fit fashion. The pole is an elongate member which spans the distance between the two opposing sides of a conveyor structure and is generally parallel to the conveyor belt surface. In one embodiment the pole is a 1"×1" steel tube. The blade is snap fit onto the pole by first arranging the blade to be partially engaged with the pole, and then rotating the blade relative to the pole to achieve a snap fit. The blade is configured so that once it is in snap fit engagement on the pole it is able to resist the torsion forces applied to it as the tensioner mechanism applies a torque to the pole for urging the scraper blade against the belt surface. Additionally the blade is configured such that it can be removed (disengaged from its snap-fit) from the pole by imparting a torsion force on the blade that is in the opposite direction to the normal torsion forces experienced by the blade when in operation. In this manner, the blade can resist the torsion forces experienced during operation yet still be easily removed from the pole for cleaning or replacement.

The blade may be made from a single material or multiple materials, such as UHMW or a Rigid PVC/Urethane combination. It may also be made in multiple sizes to accommodate different diameter head pulleys.

Special considerations must be taken into account when designing products that are to be used in food processing. Due to the high risk of bacteria growth, food processing equipment must be cleaned and sanitized regularly. For this reason it is beneficial for the equipment to be designed in such a way that minimizes the opportunity for bacteria growth and maximizes the clean-ability of the equipment. One way to make a piece of equipment easier to clean is to make it very easy to disassemble. Another way is to minimize the number of areas for bacteria to grow and make these areas "open" so that they are easier to clean.

Figure 6:
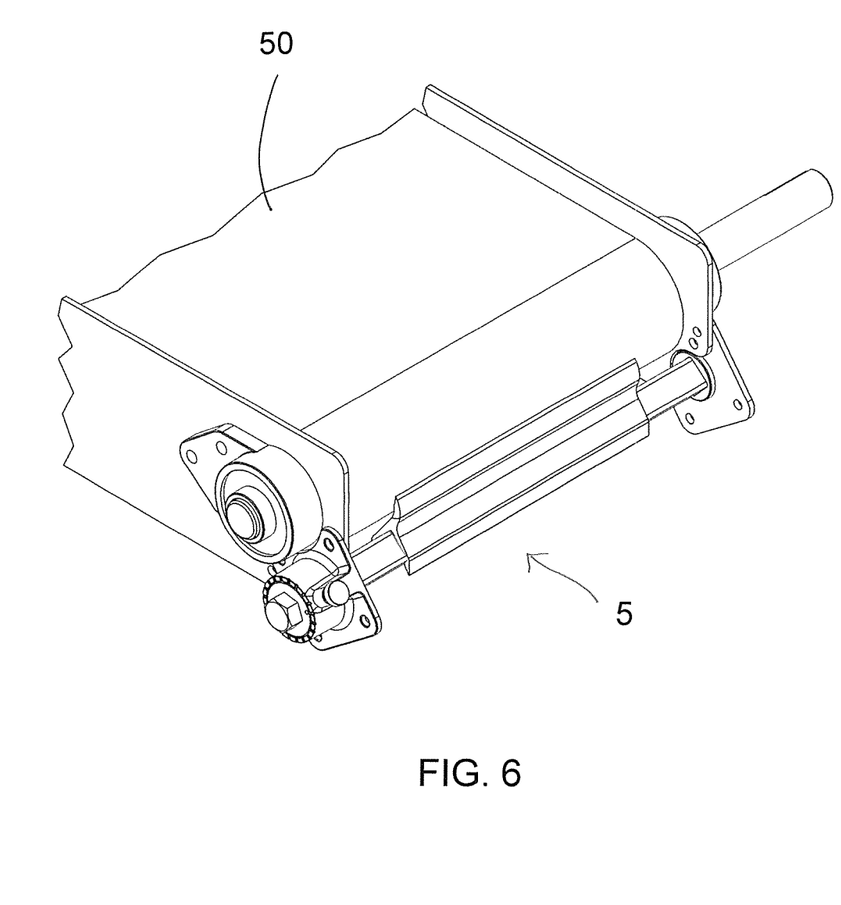
FIGS. 6-8 are perspective views of a belt cleaning system showing the snap-fit blade snap-fit onto the square pole and being oriented for scraping engagement with a conveyor belt at an end pulley therefor.
Figure 7:
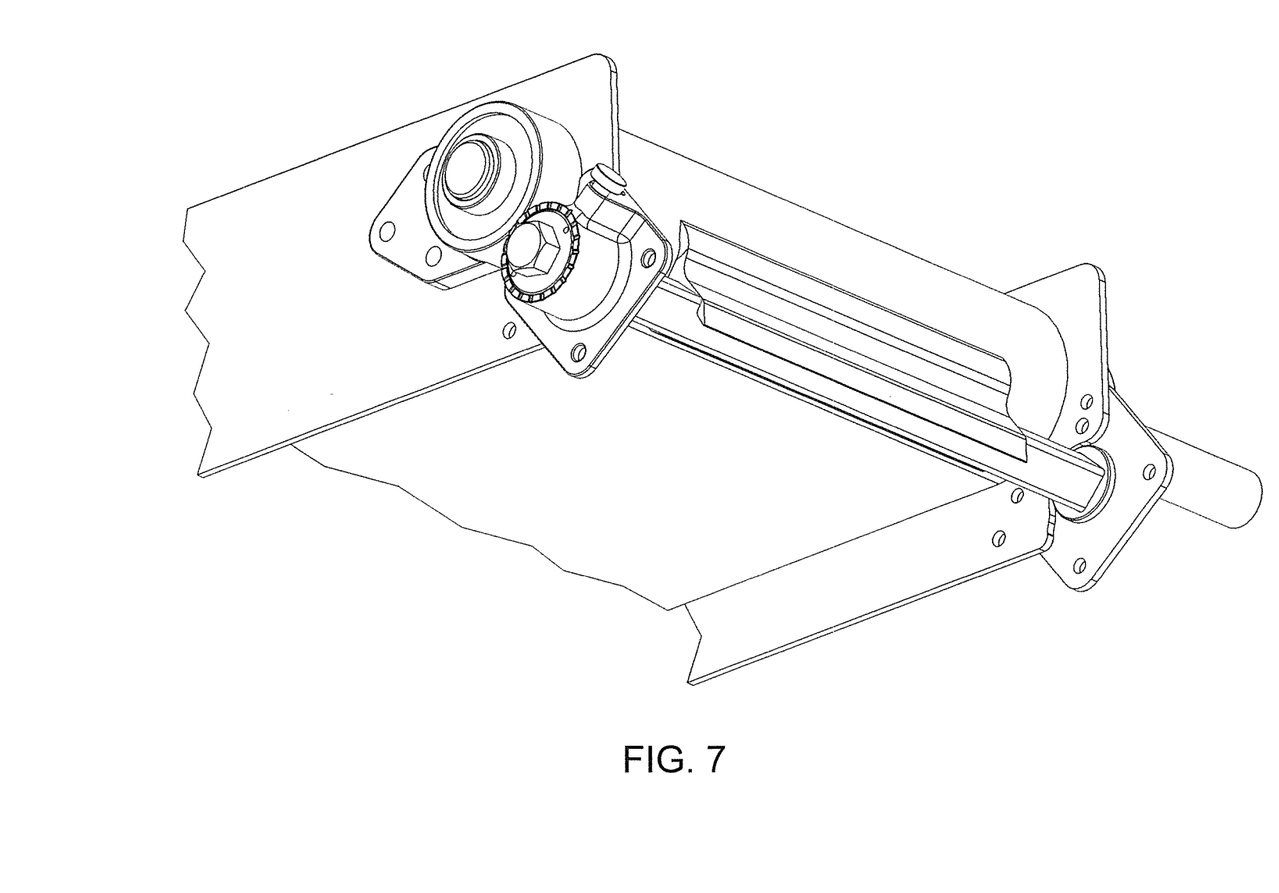
Figure 8:
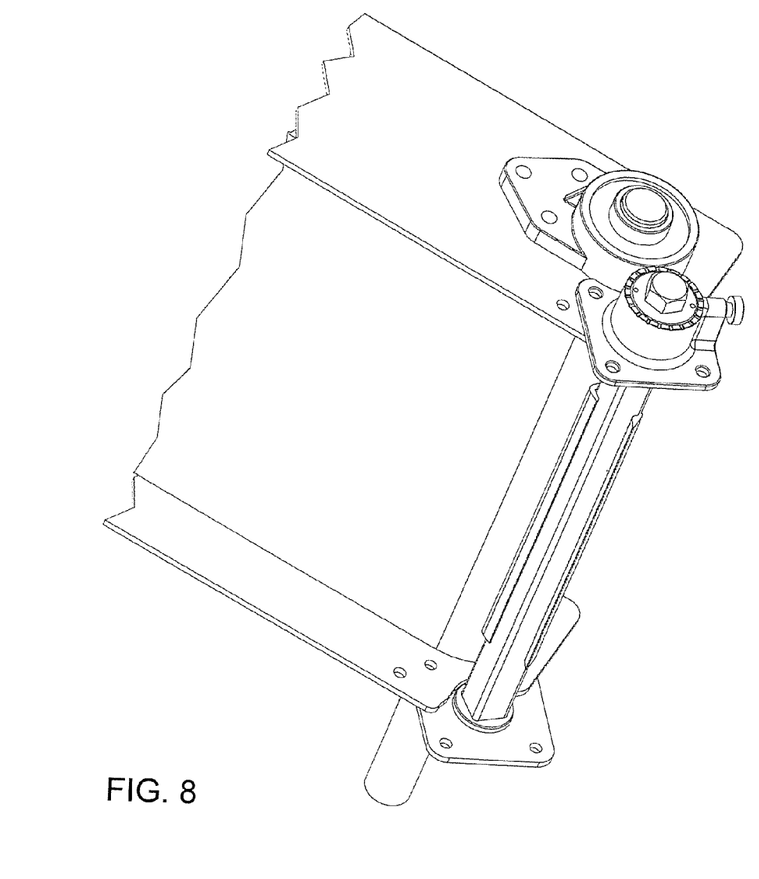

The scraper blade discussed above improves the clean-ability of the conveyor belt cleaner because it is very quick and easy to install and remove. When it is time to clean the conveyor system (FIGS. 6-8), the cleaner can then be quickly disassembled and its components sprayed down or submerged in a tub of cleaning solution.

The geometry of the scraper blade minimizes the number of places for debris to collect and areas for bacteria to grow. This is achieved by orienting the flat faces of the square pole at approximately a 45 degree angle to the horizon, such that the legs of the blade body which are adjacent to the surfaces of the pole form inclined faces which do not permit debris to collect as easily. It is also extruded from a single piece, which is more easily cleaned than some competitive blades which are made from individual segments butted together thereby forming interfaces between each blade segment.

Additionally, the blade is designed to be snap-fit onto a square pole so that it resists rotation of the blade relative to the pole without the addition of keys and corresponding keyways or other anti-rotation devices which can make the pole more difficult to clean.

The snap-fit is also beneficial because it does not require the use of pins or other hardware to retain the blade on the pole, which could otherwise potentially become loose and end up in the conveyed product (food).

The legs of the scraper blade 5 may be oriented at an acute angle to one another (FIG. 1A), thereby forming an inwardly biased force and a positive engagement once the cleaner blade is in snap-fit engagement with the square pole. In doing so, sufficient is friction is generated between the pole and the blade to substantially minimize or eliminate axial migration of the blade relative to the pole during use.

Figure 1A:
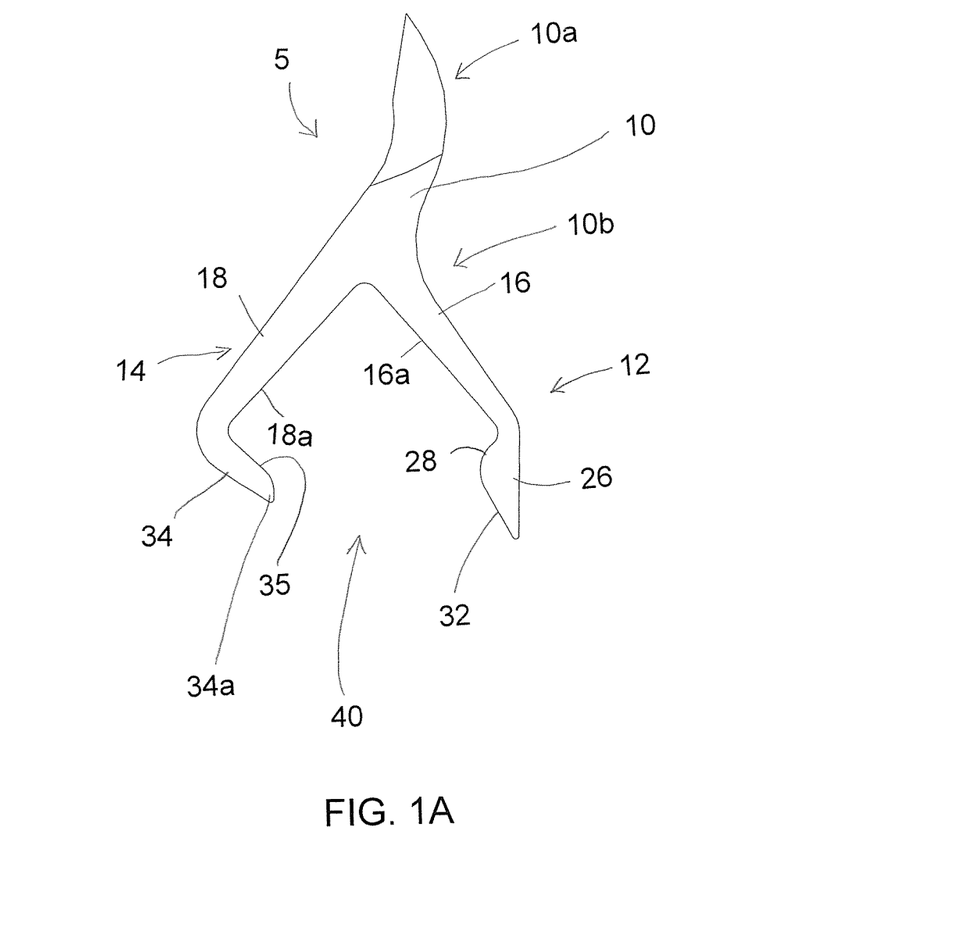
Figure 2:
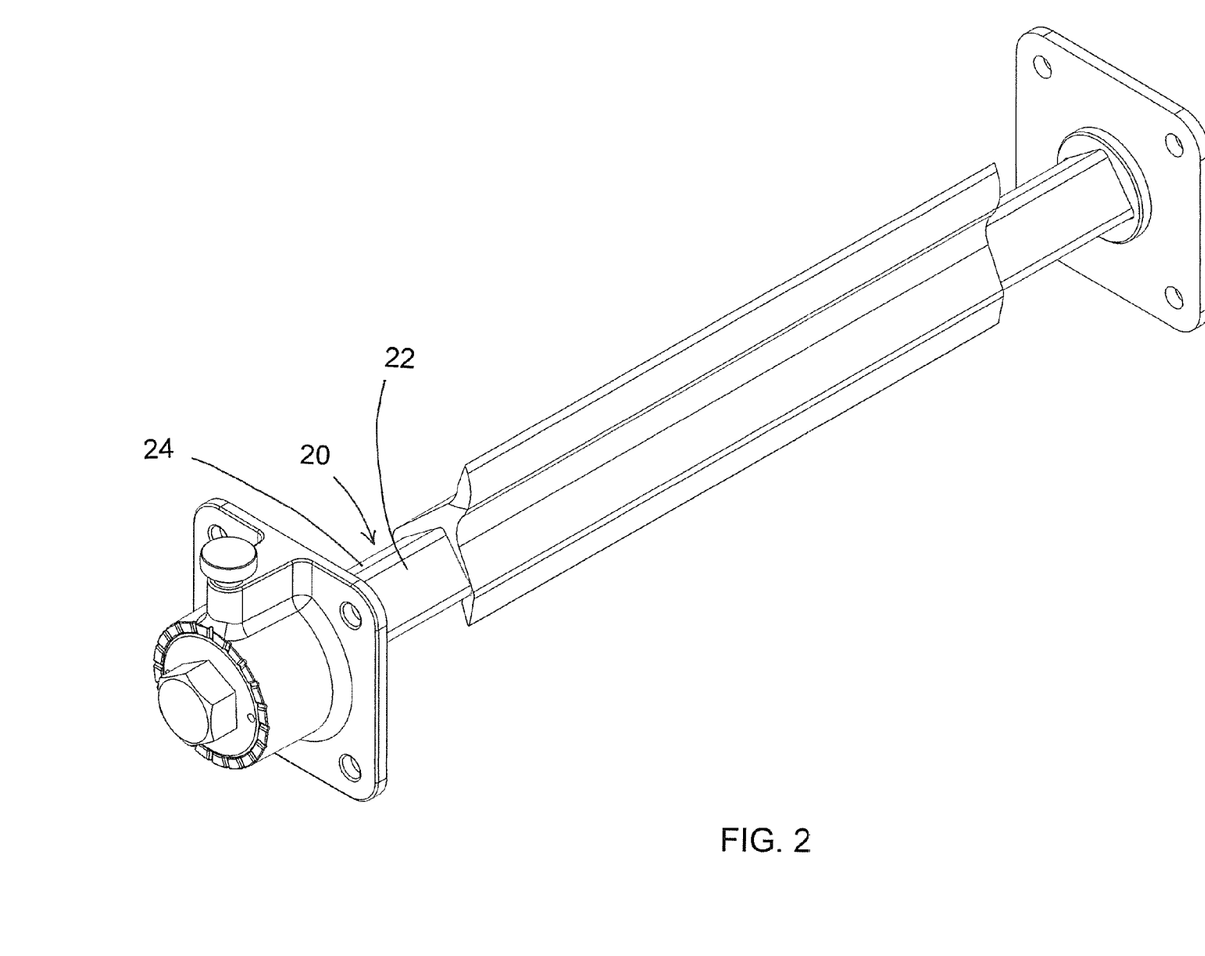
FIGS. 2-5 are perspective views of the snap-fit scraper blade of FIGS. 1 and 1A snap-fit onto a square pole.

As can be best seen in FIG. 1A, the blade body 10 has an upper belt scraping portion 10a having a tip end for engaging a conveyor belt 50 (FIGS. 6-8) and a lower pole mounting portion 10b. The lower portion 10b includes a downstream leg 12 that extends at an acute angle to upstream leg 14 between respective upper portions 16 and 18 thereof, and specifically substantially flat, inclined inner surfaces 16a and 18a of the upper portions 16 and 18 of the respective legs 12 and 14. In this manner, when snap-fit on square pole 20, the resilient legs 12 and 14 are splayed apart from each other causing them to tightly grip on corresponding inclined pole downstream and upstream surfaces 22 and 24.

Figure 3:
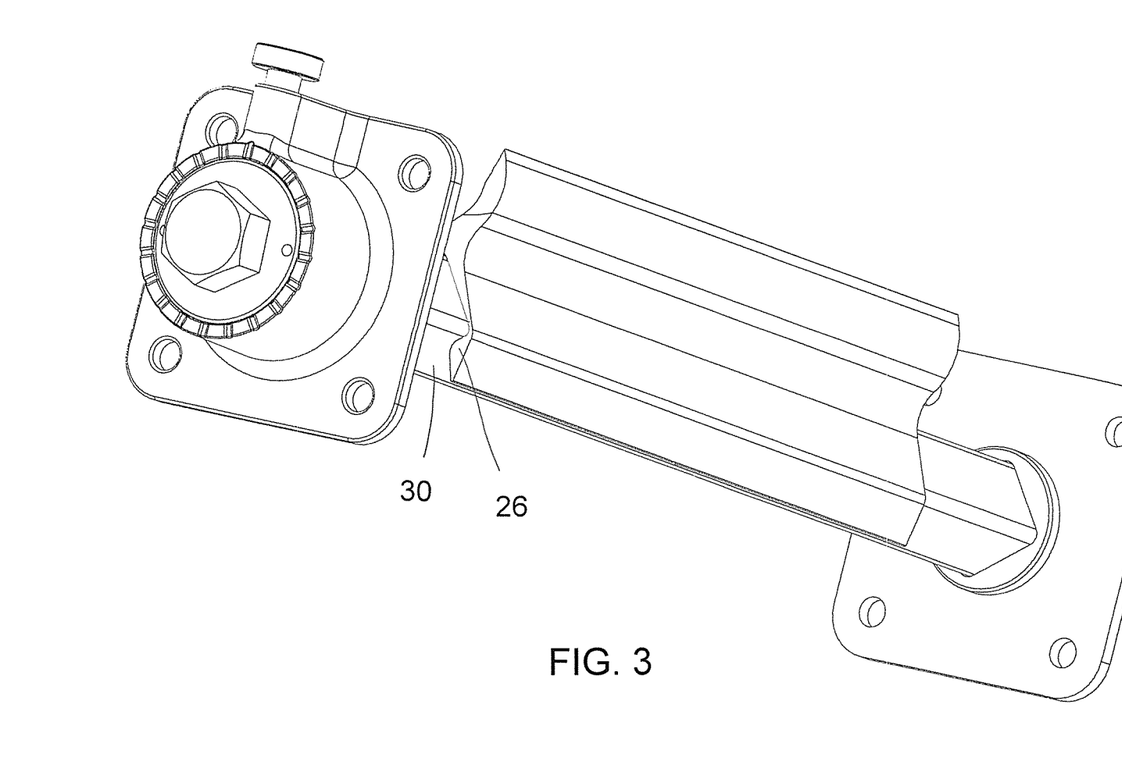
Figure 4:
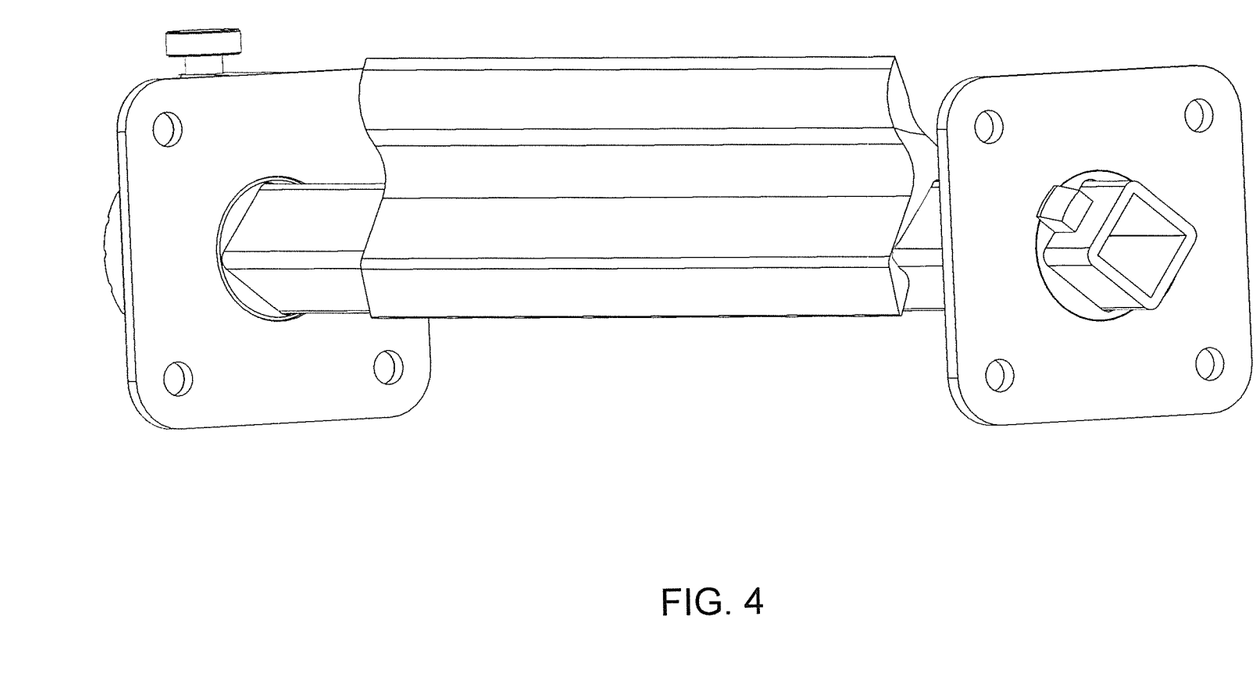
Figure 5:
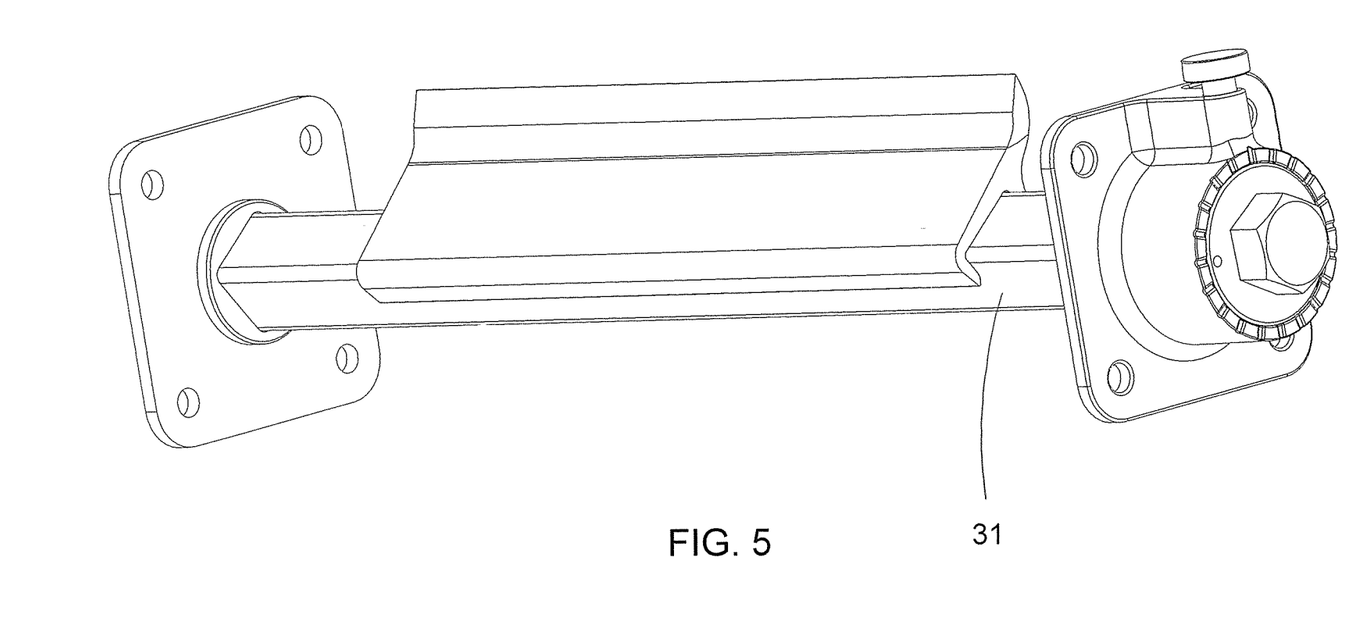

As previously mentioned, the blade is rotatably snap-fit onto the pole 20. For this purpose, the downstream leg 12 has a lowermost, enlarged gripping portion 26 that includes a substantially flat, inclined inner surface 28 extending generally orthogonal to the inner surface 16*a* for engaging corresponding lower, downstream inclined surface 30 of the square pole 20 (FIG. 3). Similarly, the upstream leg 18 has a lowermost gripping portion 34 that includes a substantially flat, inclined inner surface 35 extending generally orthogonal to inner surface 18*a* for engaging corresponding lower, upstream inclined surface 31 of the square pole 20 (FIG. 5). In addition, the enlarged bottom leg portion 26 has a lowermost guide or cam surface 32 that extends at an outward incline from the bottom of the inner surface 28. The legs 12 and 14 at their respective lowermost portions 26 and 34 are spaced from each other to form an opening 40 therebetween for fitting the square pole 20 between the legs 12 and 14 as described below.

For connecting the blade to the pole, the guide surface 32 is engaged with and pushed along the upper, downstream inclined pole surfaces 22 causing the leg 12 to begin to resiliently flex away from the leg 14 with the tip end 34*a* of its lowermost gripping portion 34 engaged with the upper, upstream inclined pole surface 24. With the leg cam surface 32 engaged on pole surface 22, the blade can be rotatably snap-fit onto the pole 20 with the tip end 34*a* rotated to clear the corner between the upstream orthogonal surfaces 24 and 31 of the pole 20, and the juncture between the blade body surfaces 28 and 32 clearing the corner between the downstream orthogonal surfaces 22 and 30 of the pole 20.

Those skilled in the art will recognize that a wide variety of modifications, alterations, and combinations can be made with respect to the above described embodiments without departing from the spirit and scope of the invention, and that such modifications, alterations, and combinations, are to be viewed as being within the scope of the invention.

What is claimed is:

1. A conveyor belt cleaner comprising:
   a snap-fit scraper blade;
   an elongate mounting member for extending across a belt and having a square cross-sectional configuration;
   a single-piece blade body having an upper belt scraping portion for engaging a belt and a lower mounting portion for being mounted to the elongate mounting member;
   depending legs of the lower mounting portion of the single-piece blade body;
   upper portions of the depending legs that have substantially flat, inclined inner surfaces that meet and extend away from each other at an acute angle relative to each other;
   lower gripping portions of the depending legs that have substantially flat, inclined inner surfaces that extend toward each other generally orthogonal to the corresponding upper portion inner surface;
   upstream orthogonal surfaces and downstream orthogonal surfaces of the elongate mounting member; and
   an opening between the lower gripping portions of the depending legs sized to allow the legs to be snap-fit onto the elongate mounting member with the depending legs splayed apart from each other so that the flat inner surfaces of the upper and lower portions of the legs tightly engage against the corresponding surfaces of the elongate mounting member.

2. The snap-fit scraper blade of claim 1 wherein the lower gripping portion of a downstream one of the depending legs is enlarged and includes a cam surface that extends at an outward incline from a bottom of the inclined inner surface of the enlarged lower gripping portion for rotatably snap-fitting the blade body onto the elongate mounting member.

\* \* \* \* \*